United States Patent [19]

Sandler

[11] 4,298,517
[45] Nov. 3, 1981

[54] TETRAHALOPHTHALATES AS FLAME RETARDANT PLASTICIZERS FOR HALOGENATED RESINS

[75] Inventor: Stanley R. Sandler, Springfield, Pa.

[73] Assignee: Pennwalt Corporation, Philadelphia, Pa.

[21] Appl. No.: 68,987

[22] Filed: Aug. 23, 1979

Related U.S. Application Data

[63] Continuation-in-part of Ser. No. 972,601, Dec. 22, 1978, abandoned.

[51] Int. Cl.$^3$ ............................ C08K 5/12; C08J 3/18
[52] U.S. Cl. ...................... 260/31.8 HA; 260/31.8 K; 260/31.8 G
[58] Field of Search ................ 260/31.8 K, 31.8 HA, 260/31.8 P, 31.8 G

[56] References Cited

U.S. PATENT DOCUMENTS

| | | | |
|---|---|---|---|
| 2,073,937 | 3/1937 | Kyrides | 260/31.8 |
| 2,588,512 | 3/1952 | Gamrath | 260/31.8 |
| 2,985,612 | 5/1961 | Mills | 260/31.8 |
| 3,642,646 | 2/1972 | Marcus | 528/288 |
| 3,775,165 | 11/1973 | Young et al. | 260/45.85 T |
| 4,098,704 | 7/1978 | Sandler | 106/18.31 |
| 4,113,689 | 9/1978 | Modera et al. | 260/31.8 HA |

FOREIGN PATENT DOCUMENTS

2719431  9/1978  Fed. Rep. of Germany ..... 260/31.8

OTHER PUBLICATIONS

Kirk–Othmer, Encyclopedia of Chem. Technology, vol. 15, pp. 456–457.

*Primary Examiner*—Joseph L. Schofer
*Assistant Examiner*—Peter F. Kulkosky

[57] ABSTRACT

A flame retarded composition containing tetrahalophthalate plasticizer and a halogenated resin is provided.

10 Claims, No Drawings

TETRAHALOPHTHALATES AS FLAME RETARDANT PLASTICIZERS FOR HALOGENATED RESINS

This application is a continuation-in-part of Ser. No. 972,601 filed Dec. 22, 1978 abandoned.

BACKGROUND OF THE INVENTION

The present invention relates to a composition containing tetrahalophthalate plasticizer admixed with a halogenated resin. This invention also comprehends the method of improving the flame retardancy of a halogenated resin by using tetrahalophthalate plasticizers.

Although polyoxyalkylene tetrahalophthalates are known in the prior art for flame proofing materials, no teachings were found of using this material as a plasticizer or a flame retardant for halogenated resins such as polyvinyl halides. U.S. Pat. Nos. 4,098,704 describes the use of polyoxyalkylene tetrahalophthalates as flame retardant finishes for 100% polyester fabrics. This is an entirely different application than from that of the instant invention which is related to the plasticization of halogenated resins. The compositions of this invention are prepared to obtain a proper balance between flame retardancy and plasticization properties and yet provide lower smoke values on combustion. U.S. Pat. Nos. 4,094,850 and 2,525,961 and British Pat. No. 1,505,450 describe the use of haloalkyl esters of phthalates as flame retardant plasticizers for resins including PVC. These compositions have the disadvantage of containing labile aliphatic bromine groups which tend to give discolored resins more easily upon heat processing. These compositions are also more expensive since they require the use of not readily available bromoalcohols to form the diesters.

SUMMARY OF THE INVENTION

The present invention is directed to a composition comprising halogenated resin and a flame retardant plasticizer of the formula

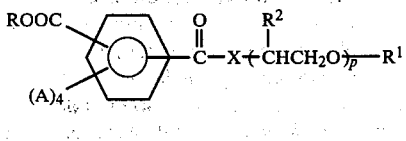

wherein
(a) the ring can have all possible isomeric arrangements;
(b) R is selected from the group consisting of hydrogen, alkyl or substituted alkyl of 1 to 10 carbons, hydroxyl alkyl of 2 to 10 carbons, and polyhydroxy alkyl of 3 to 10 carbons;
(c) $R^1$ is selected from the group consisting of hydrogen, an alkyl or substituted alkyl of 1 to 12 carbons and

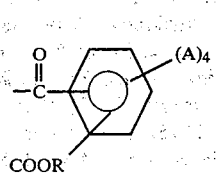

(d) $R^2$ is selected from the group consisting of hydrogen and $CH_3-$;
(e) p is an integer of 0 to 50;
(f) X is selected from oxygen or NH; and
(g) A is selected from Cl or Br.

This invention also comprehends the method of improving the flame retardancy of a halogenated resin by incorporating in the resin a tetrahalophthalate plasticizer as described above.

The tetrahalophthalate of this invention is added to the halogenated resin either along or in combination with dioctyl phthalate (DOP) as a co-plasticizer. The tetrahalophthalate is added to the halogenated resins in any convenient manner, such as by blending or milling to get a uniform composition. Other ingredients such as stabilizers, fillers, flame retardants or smoke suppressants may also be present.

Representative compounds of this invention are:

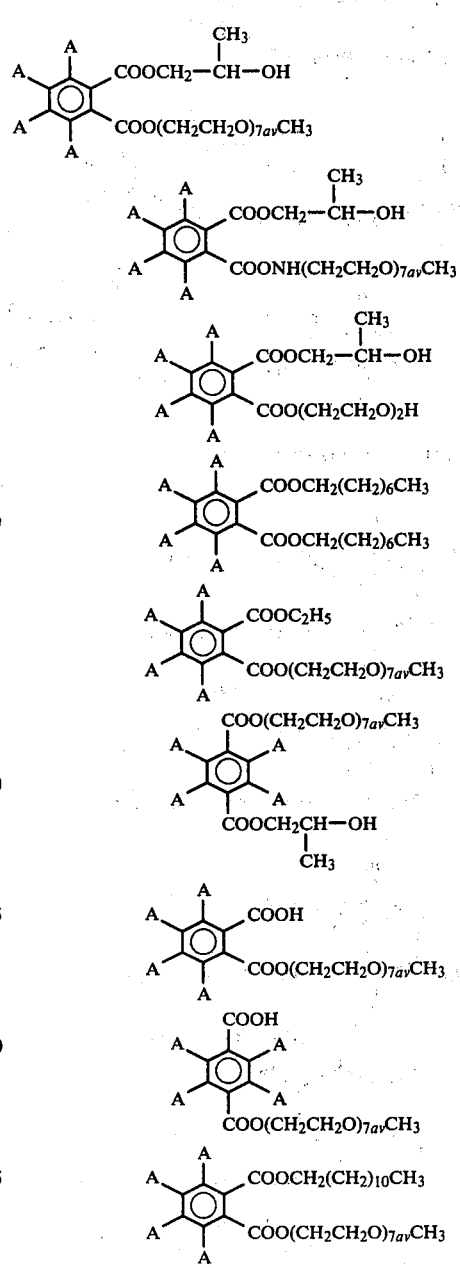

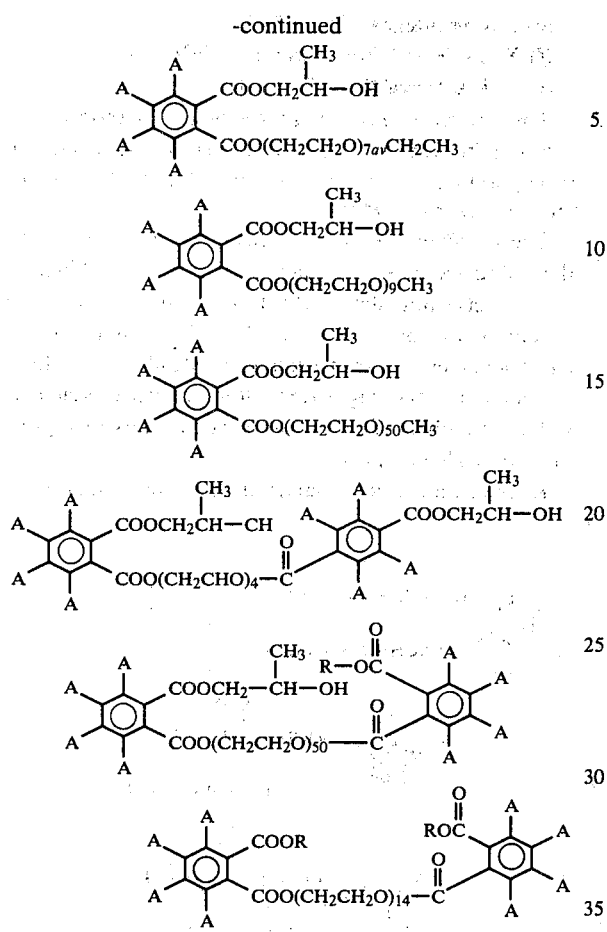

The preferred compositions are:

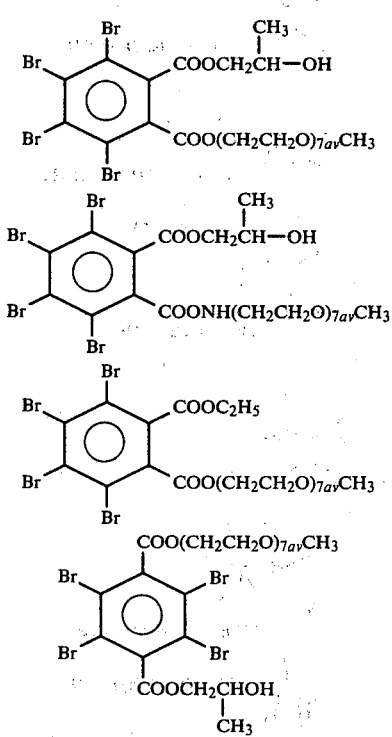

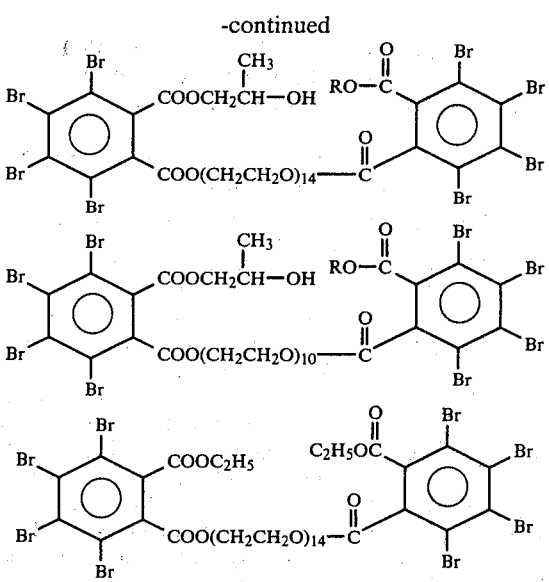

The R in the above formulas is

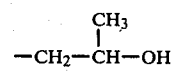

and A is Br or Cl.

A variety of halogenated resins are contemplated by this invention. Applicable poly(vinyl halide)s include homopolymers, copolymers, and polymer mixtures, as for example:

1. Homopolymers—poly(vinyl chloride), poly(vinyl bromide), poly(vinyl fluoride), poly(vinylidene chloride), poly(vinylidene fluoride) and the like;
2. Copolymers—vinyl chloride-vinyl acetate, vinyl chloride-vinyl alcohol, vinyl chloride-vinylidene chloride, vinyl chloride-vinylidene fluoride, vinyl chloride-diethyl maleate and the like; and
3. Mixtures—poly(vinyl chloride) and poly(dichlorostyrene), poly(vinyl chloride) and vinyl acetate-vinyl chloride copolymer, poly(vinyl chloride), poly(vinylidene chloride) and a copolymer of vinyl chloride-diethyl maleate.

The term halogenated resin also includes halogenated polyolefins, halogenated polystyrene, halogenated polyesters and chlorosulfonated polyethylene (Hypalon).

The compound of this invention is a clear, almost colorless and odorless liquid. It can be blended with all ingredients typically used with plasticized PVC (i.e., stabilizers, fillers, antimony oxide, and common plasticizers) and can be used at levels from 1–100 parts per hundred parts resin.

The intent of the following Example is to illustrate the present invention and is not to be a limitation thereof. Flame retardancy of the novel halogenated resin composition is evaluated by ASTM-D2863-74 to give oxygen index values. Smoke-density valves are determined by burning 3×3×0.03 inch (6.8 grams) specimens in an NBS Smoke Chamber using the flaming mode in accordance with ASTM Special Technical Publication 422 (1969) and NFPA 258-T "Smoke Generated by Solid Materials," May, 1974. The average of two values is reported.

EXAMPLE 1

To 1,392 g (3.0 moles) of tetrabromophthalic anhydride were added 1,050 g (3.0 moles) of Methoxy Carbowax 350 in the presence of 22.0 g of sodium acetate. The mixture was heated at 90° C. for 8 hours in a nitrogen atmosphere. The reaction mixture was filtered hot to remove the sodium acetate. The analytical data were consistent with the assigned structure:

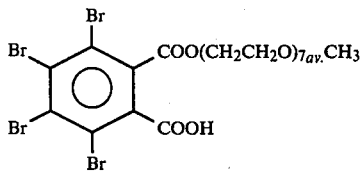

EXAMPLE 2

To the compound of Example 1 were added 348.0 g (6.0 moles) of propylene oxide and 2.0 liters of toluene. The mixture was heated at 60°-100° C. The solvent and residual propylene oxide were removed to give the product in almost quantitative yield. The analytical data were consistent with the assigned structure:

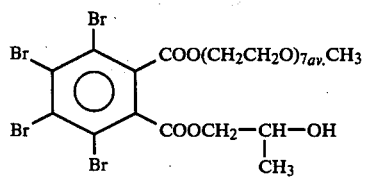

EXAMPLES 3-16

To a PVC resin were added various amounts of the compound of Example 2 blended with dioctyl phthalate (DOP) in the following formulation:

|  | Parts |
| --- | --- |
| PVC resin | 100.0 |
| Stabilizer (Argus Mark 2050)* | 2.0 |
| $Sb_2O_3$ | 4.0 |
| Epoxidized Soybean Oil | 3.0 |
| Plasticizer(s) | see TABLE A |

*Ba/Cd/Zn liquid stabilizer for flexible PVC

The ingredients were blended using a Waring Blender and then were hot milled at 260°-280° F. for 2 minutes after fusion. The milled sheets were then pressed at 360° F. at 2,000 psi for 30 seconds. TABLE A shows the results:

TABLE A

| Ex. No. | Compound of Example 2 | DOP | Phosphate Ester (Kronitex 100** FMC) | Flammability LOI | Smoke Dmc |
| --- | --- | --- | --- | --- | --- |
| 3 | — | 60 | — | 27.5 | 519 |
| 4 | 6 | 54 | — | 27.5 | 514 |
| 5 | 12 | 48 | — | 28.2 | 529 |
| 6 | 18 | 42 | — | 28.8 | 471 |
| 7 | 30 | 30 | — | 30.7 | 489 |
| 8 | 42 | 18 | — | 32.7 | 469 |
| 9 | 60 | — | — | 38.1 | 429 |
| 10 | — | 60 | — | 27.5 | 528 |
| 11 | — | 54 | 6 | 27.5 | 565 |
| 12 | — | 48 | 12 | 27.5 | 540 |
| 13 | — | 42 | 18 | 27.5 | 663 |
| 14 | — | 30 | 30 | 28.6 | 683 |
| 15 | — | 18 | 42 | 30.7 | 545 |
| 16 | — | — | 60 | 32.1 | 610 |

**Kronitex 100 = $(CH_3)_2CH—C_6H_4—O(C_6H_5O)_2P = O$ (FMC).

These results indicate that 60 parts of the compound of Example 2 (see Example 9) give less smoke on combustion when compared either to an equal amount dioctyl phthalate alone (see Example 3) or to an equal amount of a commercial plasticizer (Example 16).

EXAMPLE 17

Following the procedure and formulation of Examples 3-16, 30 parts of

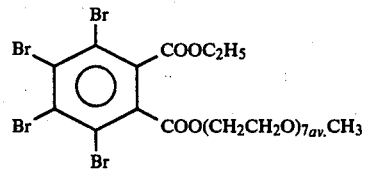

and 30 parts of DOP were added. This gave flame retardancy and smoke values similar to that obtained by Example 7.

EXAMPLE 18

Following the procedure and formulation of Examples 3-16, 30 parts of

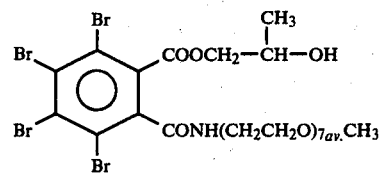

and 30 parts of DOP were added. This gave flame retardancy and smoke values similar to that obtained by Example 7.

EXAMPLE 19

Following the procedure and formulation of Examples 3-16, 30 parts of

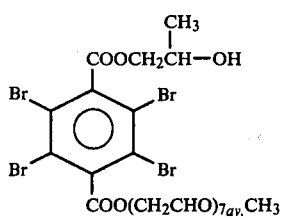

and 30 parts DOP were added. This gave flame retardency and smoke values similar to that obtained by Example 7.

EXAMPLE 20

Following the procedure and formulation of Examples 3-16, 30 parts of

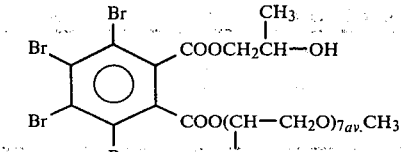

and 30 parts DOP were added. This gave flame retardancy and smoke values similar to that obtained by Example 7.

EXAMPLE 21

Following the procedure and formulation of Examples 3-16, 30 parts of

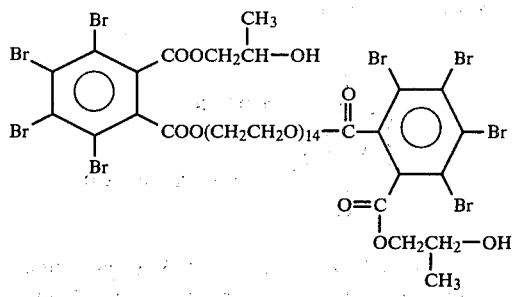

and 30 parts DOP were added. This gave flame retardancy and smoke value similar to that obtained by Example 7.

EXAMPLE 22

Following the procedure of Examples 3-16, 30 parts of the composition of Example 2 were added to a formulation containing 100 parts of Hypalon (chlorinated polyethylene) resin. The final resin had enhanced flame retardancy properties.

EXAMPLE 23

Following the procedures and formulation of Examples 3-16, 30 parts of

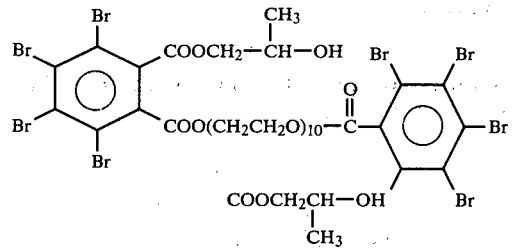

and 30 parts of DOP were added. This gave flame retardancy and smoke values similar to that obtained by Example 7.

EXAMPLE 24

Following the procedure and formulation of Examples 3-16, 30 parts of

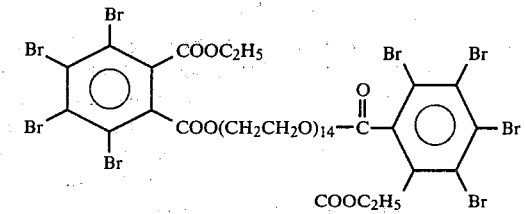

and 30 parts DOP were added. This gave flame retardancy and smoke values similar to that obtained by Example 7.

EXAMPLE 25

The procedure for Examples 3-16 was followed except the samples were milled for 3 minutes at 300° F. to 340° F. and pressed for 1 minute at 365° F. The following formulation was used:

| | Parts |
|---|---|
| Geon EP 103F-76 PVC (Goodrich) | 100 |
| Tribase XL Stabilizer (NL Industries)* | 5.0 |
| Ross Wax 165 (Ross Co.)** | 0.5 |
| Alumina Trihydrate (Alcoa) | 30.0 |
| Plasticizer (see below) | 40.0 |

*Tribase XL is a lead silicate sulfate PVC stabilizer.
**Wax to aid processing of PVC by acting as a lubricant.

For the plasticizer component 28 parts of dioctylphthalate and 12 parts of

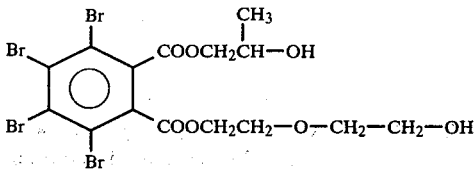

were added. This gave an LOI (flammability) of 30.4 and a NBS smoke value (Dmc) of 469.

EXAMPLE 26

Following the procedure and formulation of Example 25, 28 parts of dioctylphthalate and 12 parts of

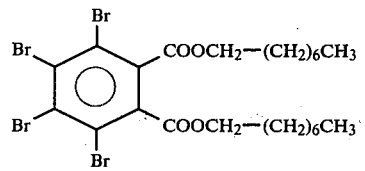

were added. This gave an LOI (flammability) and NBS smoke value (Dmc) similar to that found in Example 25.

What is claimed:

1. A composition comprising a halogenated resin and a flame and smoke retarding amount of a plasticizer of the structure:

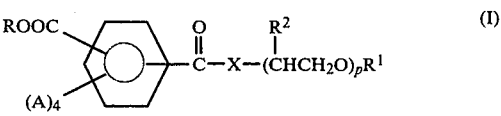

wherein
- (a) the ring can have all possible isomeric arrangements:
- (b) R is selected from the group consisting of hydrogen, an alkyl of 1 to 10 carbons, hydroxyalkyl of 2 to 10 carbons, and polyhydroxyalkyl of 3 to 10 carbons;
- (c) $R^1$ is selected from the group consisting of hydrogen, an alkyl or substituted alkyl of 1 to 12 carbons, or

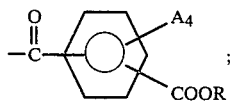

- (d) $R^2$ is independently selected from the class consisting of H and $CH_3$—;
- (e) p is an integer of 4 to 50;
- (f) x is selected from O or NH; and
- (g) A is selected from Cl or Br.

2. The composition of claim 1 where the flame and smoke retarding amount of the plasticizer is from 1–100 parts per hundred parts of the halogenated resin and said resin is poly(vinyl chloride).

3. The composition of claim 2 wherein A is Br, R is

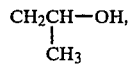

X is oxygen, $R^2$ is H, p=7av. and $R^1=CH_3$.

4. The composition of claim 2 wherein A is Br, R is $CH_2CH_3$, X is oxygen, $R^2$ is H, p=7av. and $R^1=CH_3$.

5. The composition of claim 2 wherein A is Br, R is

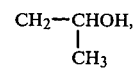

X is NH, $R^2$ is H, p=7av. and $R^1=CH_3$.

6. The composition of claim 2 wherein A is Br, R is

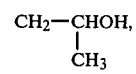

Y is oxygen, $R^2$ is H, p is 2 and $R^1$ is H.

7. The composition of claim 3 wherein the flame and smoke retardant plasticizer has the isomeric phthalate structure for the aromatic rings.

8. The composition of claim 6 wherein $R^1$ is

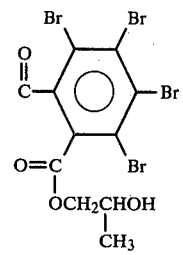

and p is 14.

9. The composition of claim 7 wherein p is 10.

10. The composition of claim 7 wherein R is $C_2H_5$.

* * * * *